(12) United States Patent
Kaufman

(10) Patent No.: US 11,153,094 B2
(45) Date of Patent: Oct. 19, 2021

(54) SECURE DATA DEDUPLICATION WITH SMALLER HASH VALUES

(71) Applicant: EMC IP Holding Company LLC, Hopkinton, MA (US)

(72) Inventor: Charles W. Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 15/965,082

(22) Filed: Apr. 27, 2018

(65) Prior Publication Data

US 2019/0334727 A1    Oct. 31, 2019

(51) Int. Cl.
*H04L 9/32* (2006.01)
*G06F 21/78* (2013.01)
*G06F 3/06* (2006.01)

(52) U.S. Cl.
CPC .......... *H04L 9/3242* (2013.01); *G06F 3/0608* (2013.01); *G06F 3/0641* (2013.01); *G06F 3/0644* (2013.01); *G06F 3/0673* (2013.01); *G06F 21/78* (2013.01)

(58) Field of Classification Search
CPC ... H04L 9/3242; G06F 3/0608; G06F 3/0641; G06F 3/0644; G06F 3/0673; G06F 21/78
USPC ........................................................ 713/189
See application file for complete search history.

(56) References Cited

U.S. PATENT DOCUMENTS

| | | | |
|---|---|---|---|
| 8,108,446 B1 * | 1/2012 | Christiaens | G06F 3/0608 707/816 |
| 8,190,835 B1 * | 5/2012 | Yueh | G06F 3/0608 711/162 |
| 8,266,430 B1 | 9/2012 | Lumb | |
| 8,321,648 B2 * | 11/2012 | Condict | G06F 3/0608 711/170 |
| 8,356,021 B2 * | 1/2013 | Williams | G06F 16/10 707/696 |

(Continued)

OTHER PUBLICATIONS

T. Krovetz, Ed., UMAC: Message Authentication Code using Universal Hashing, Mar. 2006, Network Working Group Request for Comments: 4418 Category: Informational, 27 pages , https://tools.ietf.org/pdf/rfc4418.pdf (Year: 2006).*

(Continued)

*Primary Examiner* — Shahriar Zarrineh
(74) *Attorney, Agent, or Firm* — BainwoodHuang

(57) ABSTRACT

Techniques for providing secure deduplication in a data storage system using smaller hash values. The techniques employ a keyed hash function to generate keyed hash values for data blocks received at the data storage system. The keyed hash function can generate keyed hash values having an acceptable probability of accidental collision, in which each keyed hash value requires a reduced number of bits to represent them. By representing each keyed hash value with a number of bits less than the number required for a cryptographic hash value, the impact that an index table in main memory has on the amount of free memory space available can be reduced, while still providing an acceptable probability of accidental collision. The keyed hash function can be implemented as a keyed universal hash function, which can reduce the number of processor cycles required to generate a keyed hash value for each received data block.

13 Claims, 3 Drawing Sheets

(56) References Cited

U.S. PATENT DOCUMENTS

| | | | | |
|---|---|---|---|---|
| 8,407,191 B1* | 3/2013 | Nanda | G06F 16/1748 | 707/692 |
| 8,458,144 B2* | 6/2013 | Maydew | G06F 16/1748 | 707/692 |
| 8,479,304 B1* | 7/2013 | Clifford | H04L 63/0428 | 707/692 |
| 8,650,157 B1* | 2/2014 | Jha | G06F 11/1456 | 707/640 |
| 8,650,163 B1* | 2/2014 | Harnik | G06F 3/0605 | 707/692 |
| 8,650,395 B2 | 2/2014 | Lumb | | |
| 8,739,308 B1* | 5/2014 | Roth | H04L 9/0819 | 726/32 |
| 8,799,601 B1* | 8/2014 | Chen | G06F 3/0608 | 711/161 |
| 8,805,796 B1* | 8/2014 | Hu | G06F 3/0608 | 707/692 |
| 8,914,338 B1* | 12/2014 | Wallace | G06F 3/0608 | 707/693 |
| 8,935,506 B1* | 1/2015 | Gopalan | G06F 12/1009 | 711/202 |
| 9,043,595 B2 | 5/2015 | Lumb | | |
| 9,081,771 B1* | 7/2015 | Faibish | G06F 16/00 | |
| 9,092,151 B1* | 7/2015 | Floyd | G06F 16/215 | |
| 9,104,839 B2* | 8/2015 | Gunda | G06F 3/0641 | |
| 9,141,554 B1* | 9/2015 | Candelaria | G06F 12/0864 | |
| 9,201,800 B2* | 12/2015 | Bolla | G06F 12/0866 | |
| 9,239,844 B2* | 1/2016 | Kishi | G06F 3/0608 | |
| 9,268,784 B1* | 2/2016 | Guo | G06F 3/0641 | |
| 9,323,758 B1 | 4/2016 | Stacey et al. | | |
| 9,336,092 B1* | 5/2016 | Li | G06F 21/6209 | |
| 9,350,549 B2 | 5/2016 | Lumb | | |
| 9,430,164 B1* | 8/2016 | Botelho | G06F 3/0608 | |
| 9,705,932 B1* | 7/2017 | Geil | G06F 16/2379 | |
| 9,727,273 B1* | 8/2017 | Dantkale | G06F 11/2094 | |
| 9,766,832 B2* | 9/2017 | Trimble | G06F 3/0641 | |
| 9,798,486 B1* | 10/2017 | Singh | G06F 3/065 | |
| 9,846,718 B1* | 12/2017 | Ruef | G06F 3/0641 | |
| 9,904,480 B1* | 2/2018 | Singh | G06F 16/128 | |
| 9,916,458 B2* | 3/2018 | Manville | G06F 16/134 | |
| 9,979,542 B2* | 5/2018 | Androulaki | H04L 9/0861 | |
| 9,983,827 B1* | 5/2018 | Tsirkin | G06F 3/0641 | |
| 9,984,092 B1* | 5/2018 | Harnik | G06F 16/1752 | |
| 10,425,228 B2* | 9/2019 | Androulaki | H04L 9/0861 | |
| 10,430,599 B1* | 10/2019 | Whitmer | G06F 21/6218 | |
| 10,452,297 B1* | 10/2019 | Karr | G06F 3/0673 | |
| 10,699,021 B2* | 6/2020 | De Oliveira | G06F 21/78 | |
| 2006/0271844 A1* | 11/2006 | Chen | G06F 11/1844 | |
| 2007/0081668 A1* | 4/2007 | McGrew | H04L 9/002 | 380/37 |
| 2007/0198275 A1* | 8/2007 | Malden | H04L 51/00 | 705/1.1 |
| 2008/0159331 A1* | 7/2008 | Mace | H04L 47/27 | 370/473 |
| 2009/0190760 A1* | 7/2009 | Bojinov | G06F 3/0608 | 380/269 |
| 2010/0083003 A1* | 4/2010 | Spackman | G06F 21/6209 | 713/193 |
| 2010/0159175 A1* | 6/2010 | Stoeppelmann | C08K 9/08 | 428/36.9 |
| 2010/0198797 A1* | 8/2010 | Wideman | G06F 16/1748 | 707/692 |
| 2010/0306412 A1* | 12/2010 | Therrien | H03M 7/3084 | 709/247 |
| 2010/0313036 A1* | 12/2010 | Lumb | G06F 21/602 | 713/189 |
| 2011/0022718 A1* | 1/2011 | Evans | G06F 3/0608 | 709/231 |
| 2011/0055471 A1* | 3/2011 | Thatcher | G06F 3/0608 | 711/114 |
| 2011/0066628 A1* | 3/2011 | Jayaraman | G06F 16/1748 | 707/758 |
| 2011/0087669 A1* | 4/2011 | Ancin | G06F 16/325 | 707/740 |
| 2011/0179341 A1* | 7/2011 | Falls | H03M 7/3088 | 714/807 |
| 2011/0238634 A1* | 9/2011 | Kobara | G06F 3/0608 | 707/692 |
| 2012/0084268 A1* | 4/2012 | Vijayan | G06F 3/0608 | 707/692 |
| 2012/0166448 A1* | 6/2012 | Li | G06F 16/137 | 707/747 |
| 2012/0204024 A1* | 8/2012 | Augenstein | G06F 11/1453 | 713/150 |
| 2012/0257626 A1* | 10/2012 | McGhee | H04L 43/028 | 370/392 |
| 2013/0013880 A1* | 1/2013 | Tashiro | H03M 7/30 | 711/170 |
| 2013/0018851 A1* | 1/2013 | Jayaraman | G06F 3/0641 | 707/692 |
| 2013/0036277 A1* | 2/2013 | Szczepkowski | G06F 3/0608 | 711/159 |
| 2013/0036289 A1* | 2/2013 | Welnicki | G06F 3/0689 | 711/173 |
| 2013/0073528 A1* | 3/2013 | Aronovich | G06F 16/1752 | 707/692 |
| 2013/0103945 A1* | 4/2013 | Cannon | G06F 21/6209 | 713/168 |
| 2013/0275656 A1* | 10/2013 | Talagala | G06F 12/0246 | 711/103 |
| 2013/0326115 A1* | 12/2013 | Goss | G06F 3/0641 | 711/103 |
| 2014/0013112 A1* | 1/2014 | Cidon | G06F 21/6218 | 713/165 |
| 2014/0025948 A1* | 1/2014 | Bestler | H04L 9/0863 | 713/167 |
| 2014/0157005 A1* | 6/2014 | Leventhal | H04L 9/0637 | 713/193 |
| 2014/0189348 A1* | 7/2014 | El-Shimi | G06F 21/6218 | 713/165 |
| 2014/0189365 A1* | 7/2014 | Cox | H04L 9/0866 | 713/189 |
| 2014/0215590 A1* | 7/2014 | Brand | G06F 9/5072 | 726/6 |
| 2014/0229452 A1* | 8/2014 | Serita | G06F 16/1748 | 707/692 |
| 2014/0279956 A1* | 9/2014 | Trimble | G06F 3/0608 | 707/692 |
| 2014/0281486 A1* | 9/2014 | Nayshtut | G06F 21/6227 | 713/153 |
| 2014/0358870 A1* | 12/2014 | Chambliss | G06F 16/1748 | 707/692 |
| 2015/0012503 A1* | 1/2015 | Akirav | G06F 16/1748 | 707/692 |
| 2015/0066876 A1* | 3/2015 | Li | G06F 3/0641 | 707/692 |
| 2015/0095662 A1* | 4/2015 | Jejurikar | G06F 12/14 | 713/193 |
| 2015/0293748 A1* | 10/2015 | Falk | H04L 9/3234 | 713/193 |
| 2016/0054930 A1* | 2/2016 | Dor | G06F 3/0679 | 711/102 |
| 2016/0092494 A1* | 3/2016 | Kabra | G06F 16/215 | 707/692 |
| 2016/0291891 A1* | 10/2016 | Cheriton | G06F 21/6218 | |
| 2016/0344731 A1* | 11/2016 | Serebrin | G06F 12/1475 | |
| 2016/0350301 A1* | 12/2016 | Tripathy | G06F 40/205 | |
| 2017/0063880 A1* | 3/2017 | Freed | H04L 63/1408 | |
| 2017/0103068 A1* | 4/2017 | Araki | G06F 17/3015 | |
| 2018/0025046 A1* | 1/2018 | Singhai | G06F 11/3034 | 707/692 |
| 2018/0039423 A1* | 2/2018 | Yoshii | G06F 12/00 | |

(56) References Cited

U.S. PATENT DOCUMENTS

2018/0292995 A1* 10/2018 Tal .................. G06F 3/0608
2019/0007206 A1*  1/2019 Surla .............. H04L 63/0428

OTHER PUBLICATIONS

Ted Krovetz, VMAC: Message Authentication Code using Universal Hashing, Apr. 2007, CFRG Working Group, Internet—Draft, 20 pages, https://www.fastcrypto.org/vmac/draft-krovetz-vmac-01.txt (Year: 2007).*

Krovetz, T., "UMAC: Message Authentication Code Using Universal Hashing", Network Working Group, Informational, CSU Sacramento, The Internet Society, Mar. 2006, pp. 1-27.

* cited by examiner

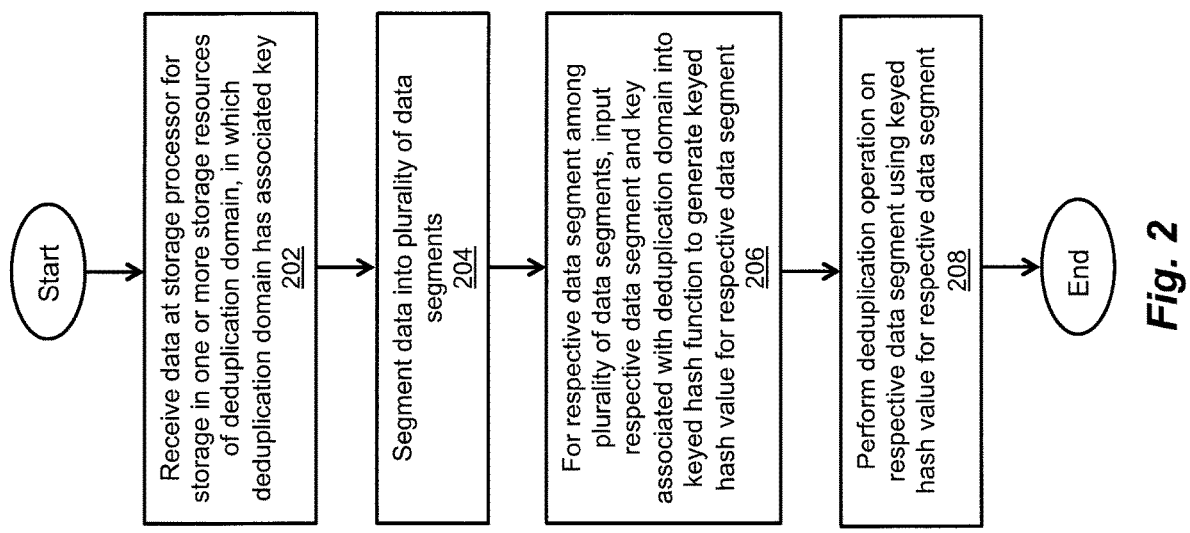

SECURE DATA DEDUPLICATION WITH SMALLER HASH VALUES

BACKGROUND

Data storage systems typically employ data deduplication (or simply "deduplication") techniques to store data more efficiently by eliminating redundant or duplicate data segments (e.g., data blocks) from the data storage systems. In such deduplication techniques, a data stream including a plurality of data blocks is received at a data storage system, and a data block identifier (e.g., a hash value) is generated for each received data block. The hash value is compared with one or more other hash values in an index table. The hash values in the index table correspond to other data blocks previously received at and stored by the data storage system. Such hash values can be weak hash values (e.g., checksums) or strong hash values (e.g., cryptographic hash values). Generally, strong hash values have a statistically negligible probability of accidental collision, while weak hash values have a higher probability of accidental collision. If the hash value of a currently received data block is a weak hash value that matches one of the hash values in the index table, then, due to the higher probability of accidental collision, a previous data block that corresponds to the matching hash value is retrieved (e.g., in a read operation) and compared with the current data block to determine whether the current data block is actually a duplicate of the previous data block. If the hash value of the current data block is a strong hash value that matches the hash value in the index table, then it is typically assumed that the current data block is a duplicate of the previous data block, and no such retrieval of and comparison with the previous data block is performed.

SUMMARY

In conventional data storage systems, there is often a tradeoff between the use of weak hash values and strong hash values for data deduplication. Whereas weak hash values are generally more computationally efficient, strong hash values are generally more computationally expensive and require more bits to represent them. For example, cryptographic hash values (such as those generated using the SHA-2-256 or SHA-2-512 hash function) having a statistically negligible probability of accidental collision may require from 256 to 512 bits or more to represent them, while checksums considered to have an adequate probability of avoiding an accidental collision may be represented by a smaller number of bits, for example, from about 48 to 64 bits. However, using such strong hash values for deduplication can be problematic because the index table containing the hash values, along with pointers mapping the hash values to locations where corresponding data blocks are stored, is typically maintained in main memory for high performance data retrieval. The larger number of bits required to represent the strong hash values in the index table can therefore have an impact on the amount of free space available in the main memory, potentially limiting the number of hash value entries that the index table can practically contain.

Techniques are disclosed herein for providing secure data deduplication in a data storage system using smaller hash values. The disclosed techniques can perform such secure data deduplication using a keyed hash function to generate keyed hash values for data blocks received at the data storage system. In one embodiment, the keyed hash function can be used to generate keyed hash values having an acceptable probability of accidental collision, in which each keyed hash value requires from about 128 to 160 bits to represent them. By representing each keyed hash value with a number of bits (e.g., from 128 to 160 bits) that is less than the number of bits (e.g., from 256 to 512 bits) generally required for a cryptographic hash value, the impact that an index table in main memory has on the amount of free memory space available can be reduced, while still providing an acceptable probability of accidental collision. In another embodiment, the keyed hash function can be implemented as a keyed universal hash function, which can reduce the number of processor cycles required to generate a keyed hash value for each received data block.

In certain embodiments, a method of providing secure data deduplication with smaller hash values in a data storage system includes receiving, at a storage processor, data for storage in one or more storage resources of a deduplication domain. The deduplication domain has an associated key. The method further includes segmenting the data into a plurality of data segments, and, for at least a respective data segment among the plurality of data segments, inputting the respective data segment and the key associated with the deduplication domain into a keyed hash function to generate a keyed hash value for the respective data segment. The method still further includes performing a data deduplication operation on the respective data segment using the keyed hash value for the respective data segment.

In certain aspects, the method includes inputting the respective data segment and the key associated with the deduplication domain into a keyed universal hash function.

In certain further aspects, the method includes, for at least some of the plurality of data segments, inputting the respective data segments and the key associated with the deduplication domain into the keyed hash function to generate respective keyed hash values for the data segments, and maintaining the respective keyed hash values for the data segments in an index table corresponding to the deduplication domain.

In certain additional aspects, the storage processor includes a memory, and the method includes storing the index table in the memory of the storage processor.

In certain other aspects, the storage resources of the deduplication domain are located in a storage pool, and the method includes storing the index table in the same storage pool as the storage resources of the deduplication domain.

In certain aspects, the performing of the data deduplication operation includes comparing the keyed hash value for the respective data segment with the respective keyed hash values maintained in the index table, and determining whether the keyed hash value for the respective data segment matches any of the respective keyed hash values maintained in the index table. Having determined that the keyed hash value for the respective data segment matches one of the respective keyed hash values maintained in the index table, the method further includes (i) generating metadata for the respective data segment, in which the metadata includes the keyed hash value of the respective data segment, a pointer to a storage location of a data segment having the matching keyed hash value, and a reference to an original location of the respective data segment in the received data, and (ii) removing the respective data segment from the data storage system.

In certain further aspects, having determined that the keyed hash value for the respective data segment does not match any of the respective keyed hash values maintained in the index table, the method includes (i) storing the respective data segment in association with one or more other data segments from the received data at a storage location in one of the storage resources of the deduplication domain, and (ii) incorporating the keyed hash value of the respective data segment and a pointer that maps the keyed hash value of the respective data segment to the storage location of the respective data segment into a new entry for the index table.

In certain additional aspects, the method includes accessing, over a network, the key associated with the deduplication domain from a secure key server computer, as well as issuing a key request to the secure key server computer to obtain the key over the network.

In certain other aspects, the method incudes representing the keyed hash value for the respective data segment by a number of bits in a range of 128 to 160 bits.

In certain further embodiments, a system for providing secure data deduplication with smaller hash values includes a plurality of storage resources of a deduplication domain, a memory, and a storage processor operative to execute instructions out of the memory (i) to receive data for storage in one or more of the plurality of storage resources of the deduplication domain, in which the deduplication domain has an associated key, (ii) to segment the data into a plurality of data segments, (iii) for at least a respective data segment among the plurality of data segments, to input the respective data segment and the key associated with the deduplication domain into a keyed hash function to generate a keyed hash value for the respective data segment, and (iv) to perform a data deduplication operation on the respective data segment using the keyed hash value for the respective data segment.

In certain aspects, the storage processor is further operative to execute the instructions out of the memory to input the respective data segment and the key associated with the deduplication domain into a keyed universal hash function.

In certain further aspects, the storage processor is further operative to execute the instructions out of the memory to represent the keyed hash value for the respective data segment by a number of bits in a range of 128 to 160 bits.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings, in which like reference characters refer to the same parts throughout the different views.

FIG. 1b is a block diagram of exemplary index tables maintained in main memory of the data storage system of FIG. 1a; and FIG. 2 is a flow diagram of an exemplary method of providing secure data deduplication with smaller hash values, using the data storage system of FIG. 1a.

DETAILED DESCRIPTION

Techniques are disclosed herein for providing secure data deduplication in a data storage system using smaller hash values. The disclosed techniques employ a keyed hash function to generate keyed hash values for data blocks received at the data storage system. The keyed hash function can generate keyed hash values having an acceptable probability of accidental collision, in which each keyed hash value requires a reduced number of bits to represent them. By representing each keyed hash value with a number of bits that is less than the number of bits generally required for a cryptographic hash value, the impact that an index table in main memory has on the amount of free memory space available can be reduced, while still providing an acceptable probability of accidental collision. The keyed hash function can be implemented as a keyed universal hash function, which can reduce the number of processor cycles required to generate a keyed hash value for each received data block.

Figure 1A:
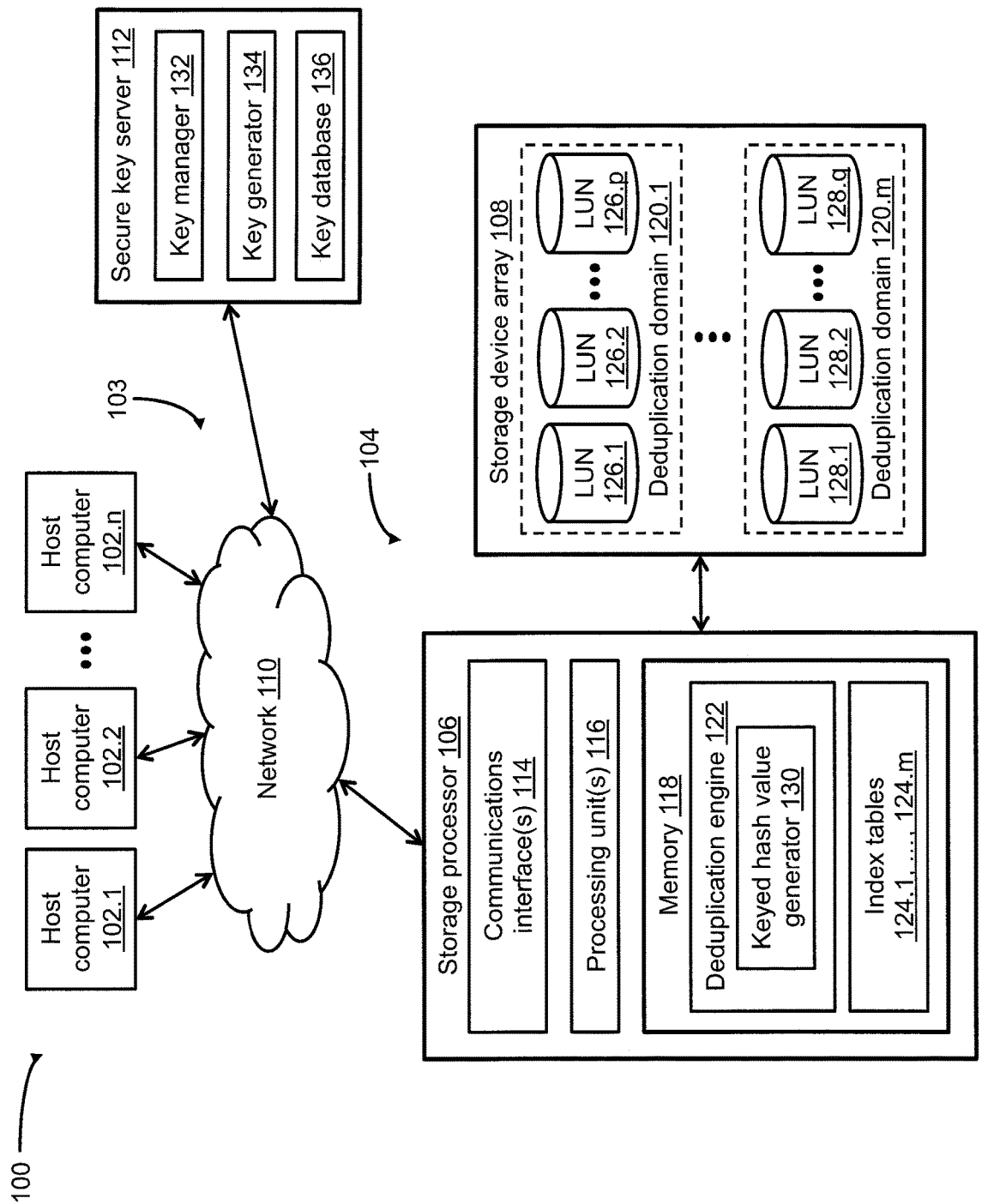
FIG. 1a is a block diagram of a data storage environment, in which an exemplary data storage system configured to provide secure data deduplication using smaller hash values can be employed.

FIG. 1a depicts an illustrative embodiment of a data storage environment 100, in which an exemplary data storage system 104 configured to provide secure data deduplication using smaller hash values can be employed. As shown in FIG. 1a, the data storage environment 100 can include a plurality of host computers 102.1, 102.2, . . . , 102.n communicably coupled to the data storage system 104 by a communications medium 103 that includes a network 110. For example, each of the plurality of host computers 102.1, 102.2, . . . , 102.n may be configured as a web server computer, a file server computer, an email server computer, an enterprise server computer, a database server computer, and/or any other suitable client or server computer or computerized device, for providing input/output (IO) requests (e.g., small computer system interface (SCSI) commands) to the data storage system 104 over the communications medium 103. Such JO requests (e.g., write requests, read requests) provided by the plurality of host computers 102.1, 102.2, . . . , 102.n can direct the data storage system 104 to store/retrieve data blocks and/or files to/from storage resources (e.g., logical unit numbers (LUNs), virtual volumes (VVOLs), file systems) on behalf of the respective host computers 102.1, 102.2, . . . , 102.n. The data storage system 104 can be configured to process such JO requests from one or more of the host computers 102.1, 102.2, . . . , 102.n, and store host data in a redundant array of independent disk (RAID) environment implemented by a storage device array 108. In certain embodiments, the data storage system 104 can be configured to store the host data in a cloud-based storage environment or any other suitable data storage environment.

The communications medium 103 can be configured to interconnect the plurality of host computers 102.1, 102.2, . . . , 102.n with the data storage system 104 (including a storage processor 106) to enable them to communicate and exchange electronic and/or optical signals. As shown in FIG. 1a, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper-based data communications devices and cabling, fiber optic devices and cabling, wireless devices, or any suitable combination thereof. In addition, the communications medium 103 can be configured to support storage area network (SAN)-based communications, local area network (LAN)-based communications, cellular communications, wide area network (WAN)-based communications, distributed infrastructure communications, and/or any other suitable communications.

As shown in FIG. 1a, the data storage system 104 can include the storage processor 106 and the storage device array 108. The storage processor 106 can include one or more communications interfaces 114, one or more processing units 116, and at least one memory 118. For example, each communications interface 114 may include an adapter, such as a SCSI target adapter and/or network interface adapter, for converting electronic and/or optical signals received over the network 110 to electronic form for use by the storage processor 106. Further, each processing unit 116 may include one or more processing chips and/or assemblies, including, for example, one or more multi-core central processing units (CPUs). The memory 118 may include volatile memory (e.g., random access memory (RAM)) and non-volatile memory (e.g., read-only memory (ROM), disk drive(s), solid-state drive(s) (SSDs)). The processing unit(s) 116 and the memory 118 in combination form control circuitry that can be configured and arranged to perform the methods and/or operations described herein. For example, the memory 118 may include a variety of software constructs, including a deduplication engine 122 realized in the form of executable instructions. When executed by the processing unit(s) 116, the instructions can cause the processing unit(s) 116 to carry out the methods and/or operations specified by the software constructs. Although certain software constructs are described herein for providing secure data deduplication with smaller hash values, it is noted that the memory 118 may also include other software constructs, including, but not limited to, operating systems, applications, processes, and/or daemons.

As further shown in FIG. 1a, the storage device array 108 can include a plurality of deduplication domains 120.1, ..., 120.m. As employed herein, the term "deduplication domain" refers to a set of storage resources sharing a common set of data (e.g., data blocks) that can be deduplicated together. The deduplication domain 120.1 can include a set of storage resources 126.1, 126.2, ..., 126.p, and so on up to the deduplication domain 120.m, which can likewise include a set of storage resources 128.1, 128.2, ..., 128.q. For example, each of the storage resources 126.1, 126.2, ..., 126.p, ..., 128.1, 128.2, ..., 128.q included in the respective deduplication domains 120.1, ..., 120.m may be implemented as a LUN or any other suitable storage resource. Further, in an embodiment that employs RAID techniques, the storage devices for each deduplication domain 120.1, ..., or 120.m may be located in a separate storage pool formed by one or more RAID groups. It is noted that the memory 118 can maintain a deduplication database that includes a plurality of index tables 124.1, ..., 124.m, one for each of the respective deduplication domains 120.1, ..., 120.m.

Figure 1B:
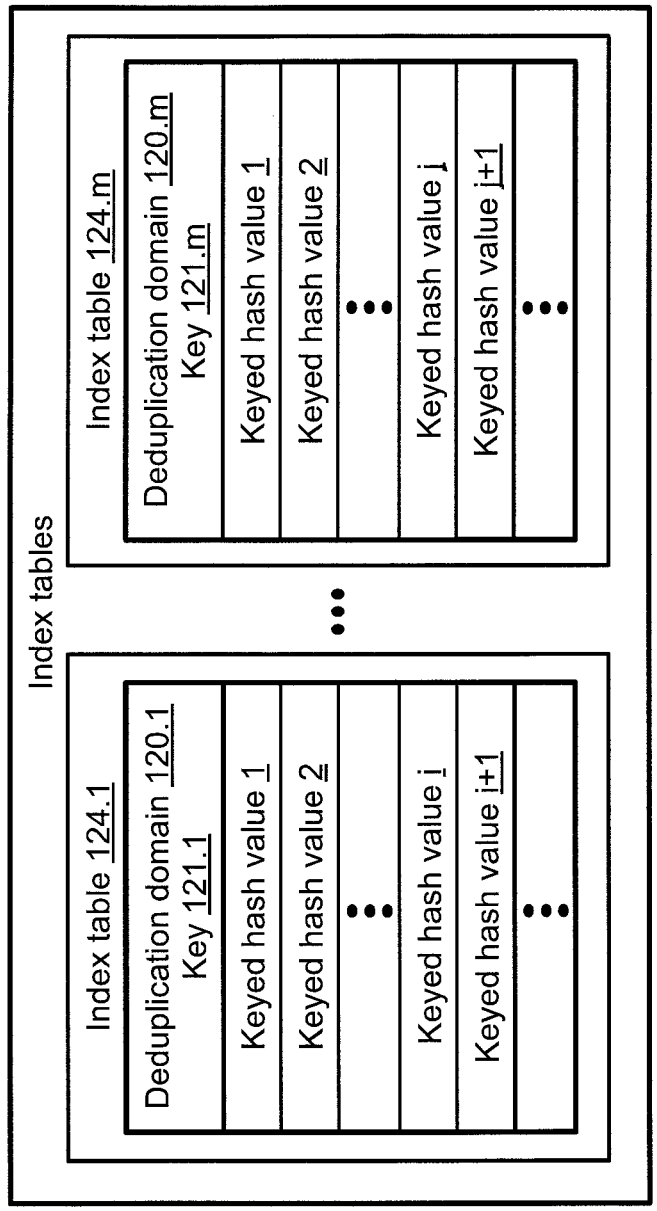

FIG. 1b depicts the plurality of index tables 124.1, ..., 124.m included in the memory 118 of the storage processor 106. For example, each index table 124.1, ..., or 124.m may be maintained in the memory 118 as a b-tree data structure or any other suitable data structure. As shown in FIG. 1b, the index table 124.1 includes a key 121.1 and a plurality of keyed hash values 1, 2, ..., i, i+1, ..., each of which corresponds to the deduplication domain 120.1, and so on up to the index table 124.m that includes a key 121.m and a plurality of keyed hash values 1, 2, ..., j, j+1, ..., each of which corresponds to the deduplication domain 120.m. Although the plurality of index tables 124.1, ..., 124.m are illustrated in FIG. 1a as being included in the memory 118 of the storage processor 106, it is noted that the plurality of index tables 124.1, ..., 124.m can alternatively be maintained in the same storage pools as the corresponding deduplication domains 120.1, ..., 120.m, respectively. It is further noted that, for each keyed hash value, the index tables 124.1, ..., 124.m can further include a pointer (e.g., an address; not shown) that maps the keyed hash value to a location in a storage resource within a respective deduplication domain where a data block corresponding to the keyed hash value is stored.

In one mode of operation, the data storage system 104 employs a data deduplication (or simply "deduplication") technique to store data more efficiently by eliminating redundant or duplicate data segments (e.g., data blocks, or multiples or fractions of data blocks) from the storage device array 108. The data storage system 104 can receive, at the storage processor 106, a data stream including a plurality of data blocks over the network 110 from one or more of the plurality of host computers 102.1, 102.2, ..., 102.n. For example, the plurality of data blocks may correspond to one of the deduplication domains 120.1, ..., 120.m included in the storage device array 108. The processing unit(s) 116 in combination with the memory 118 can execute instructions corresponding to the deduplication engine 122, which can generate a data block identifier (e.g., a hash value) for each data block currently received in the data stream, compare the hash value of the current data block with other hash values included in an index table for the respective deduplication domain, and determine whether or not the hash value of the current data block matches any of the hash values in the index table. The hash values in the index table can correspond to other data blocks previously received at and stored by the storage processor 106. If the hash value of the current data block matches one of the hash values in the index table, then the storage processor 106 can generate metadata for the current data block, and maintain the metadata in the memory 118 or in the storage pool of the respective deduplication domain. For example, such metadata may include the hash value of the current data block, a pointer (e.g., an address) that maps the hash value to a location in a storage resource within the respective deduplication domain where the previous data block corresponding to the matching hash value is stored, as well as a reference to the original location of the current data block in the received data stream. The storage processor 106 can then remove the current (duplicate) data block from the data storage system 104. Otherwise, if the hash value of the current data block does not match any of the hash values in the index table, then the storage processor 106 can store the current data block in association with one or more other data blocks from the received data stream at a location in a storage resource within the respective deduplication domain, and incorporate (i) the hash value of the current data block, and (ii) a pointer (e.g., an address) that maps the hash value to the storage location of the current data block within the respective deduplication domain, into a new entry for the index table of the respective deduplication domain.

During operation of the data storage system 104, the deduplication engine 122 can employ a keyed hash function to generate keyed hash values for the data blocks of the data stream received at the storage processor 106. In one embodiment, the keyed hash function employed by the deduplication engine 122 can generate keyed hash values having an acceptable probability of accidental collision, in which each keyed hash value is represented by a number of bits in a range of 128 to 160 bits or any other suitable number of bits. As employed herein, the term "accidental collision" refers to a situation in which two data blocks (or multiples or fractions of data blocks) have the same keyed hash value, but different data content. By representing each keyed hash value with a number of bits (e.g., from 128 to 160 bits) that is less than the number of bits (e.g., from 256 to 512 bits) generally required for a strong hash value (e.g., a cryptographic hash value), the impact that one or more index tables stored in the memory 118 have on the amount of free space available in the memory 118 can be reduced, while still providing an acceptable probability of accidental collision. In another embodiment, the keyed hash function can be implemented as a keyed universal hash function, which can reduce the number of processor cycles required by the processing unit(s) 116 to generate a keyed hash value for each data block in the received data stream.

The operation of the data storage system 104 for providing secure data deduplication using smaller hash values will be further understood with reference to the following illustrative example. In this example, the deduplication engine 122 is configured to generate a keyed hash value for each data block included in a received data stream using a message authentication code based on universal hashing, such as UMAC. UMAC is described in RFC 4418 entitled *UMAC: Message Authentication Code using Universal Hashing* dated March 2006, the disclosure of which is hereby incorporated herein by reference in its entirety. It is noted, however, that the deduplication engine 122 may alternatively employ another message authentication code based on universal hashing such as VMAC, the Galois message authentication code (GMAC), or any other suitable keyed universal hash function. Whereas cryptographic hash values generated by a cryptographic hash function (such as the SHA-2-256 or SHA-2-512 hash function) can have a statistically negligible probability of accidental collision (i.e., no two input values to the cryptographic hash function can result in the same hash value), keyed hash values generated by a keyed hash function (such as UMAC or VMAC) can have an acceptable probability of accidental collision because, without knowing the key (e.g., the key 121.1, . . . , or 121.m; see FIG. 1b), merely having the hash of one input value to the keyed hash function would not be enough to allow computation of the hash of any other input value with a probability greater than simply choosing the hash of the other input value at random.

In this example, the keys 121.1, . . . , 121.m corresponding to the deduplication domains 120.1, . . . , 120.m, respectively, can be generated and maintained by a secure key server computer 112 (also referred to herein as the "secure key server;" see FIG. 1a). Further, the keys 121.1, . . . , 121.m can be randomly generated for the deduplication domains 120.1, . . . , 120.m, respectively, and maintained in the memory 118 for the lifetime of the respective deduplication domains 120.1, . . . , 120.m. As shown in FIG. 1a, the secure key server 112 can include a key manager 132, a key generator 134, and a key database 136. The key manager 132 is configured to manage the lifecycles of the respective keys 121.1, . . . , 121.m, as well as manage the generation, expiration, and/or deletion of the keys 121.1, . . . , 121.m and their storage within the key database 136. In response to a key request issued by the storage processor 106 over the network 110, the key manager 132 can direct the key generator 134 to generate a secret random key for one of the deduplication domains 120.1, . . . , or 120.m, and securely transmit (e.g., using the TLS or SSL protocol) the generated random key (e.g., the key 121.1, . . . , or 121.m) over the network 110 to the storage processor 106 for storage in association with the index table (e.g., the index table 124.1, . . . , or 124.m) for the respective deduplication domain 120.1, . . . , or 120.m. For example, the key generator 134 may be implemented as a random number generator or a pseudo-random number generator for generating the random keys 121.1, . . . , 121.m, each of which can be 16 bytes (128 bits) or any other suitable number of bytes in length.

In this example, the data storage system 104 receives the data stream including a plurality of data blocks over the network 110 at the storage processor 106. For example, the plurality of data blocks may correspond to the deduplication domain 120.1, or any other suitable deduplication domain 120.2, . . . , or 120.m of the storage device array 108. Further, the data storage system 104 may be a page-based system, and the plurality of data blocks in the received data stream may correspond to a sequential number of data blocks in a page of data. Having received the data stream at the storage processor 106, the deduplication engine 122 can generate, using a keyed hash value generator 130 (see FIG. 1a), a keyed hash value for each data block currently received in the data stream. For example, the keyed hash value generator 130 may generate a keyed hash value for the current data block corresponding to the deduplication domain 120.1, as follows:

$$\text{Keyed hash value} = H(x,K), \tag{1}$$

in which "x" corresponds to the data content of the current data block, "K" corresponds to the key 121.1 maintained in the memory 118 for the deduplication domain 120.1, and "H( . . . )" corresponds to a predetermined keyed hash function (e.g., a keyed universal hash function) specified according to UMAC or VMAC, or any other suitable keyed hash function.

Having generated the keyed hash value for the current data block in accordance with equation (1) above, the storage processor 106 can compare the keyed hash value with each of the other keyed hash values 1, 2, . . . , i included in the index table 124.1 for the deduplication domain 120.1, and determine whether or not the keyed hash value of the current data block matches any of the keyed hash values 1, 2, . . . , i in the index table 124.1. The keyed hash values 1, 2, . . . , i in the index table 124.1 can correspond to other data blocks (or multiples or fractions of data blocks) previously received at the storage processor 106 and stored in one or more of the LUNs 126.1, 126.2, . . . , 126.p within the deduplication domain 120.1 of the storage device array 108. If the keyed hash value of the current data block matches one of the keyed hash values 1, 2, . . . , i in the index table 124.1, then the storage processor 106 can generate metadata for the current data block, and maintain the metadata in the memory 118 or in the storage pool of the deduplication domain 120.1. For example, the metadata may include, for example, the keyed hash value of the current data block, a pointer to a storage location of a previous data block with the matching hash value, and a reference to the original location of the current data block in the received data stream. The storage processor 106 can then remove the current (duplicate) data block from the data storage system 104. Otherwise, if the keyed hash value of the current data block does not match any of the keyed hash values 1, 2, . . . , i in the index table 124.1, then the storage processor 106 can store the current data block in association with one or more other data blocks from the received data stream within the deduplication domain 120.1 (e.g., at a storage location in a respective LUN 126.1, 126.2, . . . , or 126.p), and incorporate (i) the keyed hash value of the current data block, and (ii) a pointer (e.g., an address) that maps the keyed hash value to the storage location of the current data block in the respective LUN 126.1, 126.2, . . . , or 126.p, into a new entry (e.g., the keyed hash value i+1; see FIG. 1b) for the index table 124.1 of the deduplication domain 120.1.

As described herein, the data storage system 104 can operate to provide secure data deduplication by using keyed hash values that can have an acceptable probability of avoiding accidental collision while being represented by a smaller number of bits. It is noted that the data storage system 104 can also provide more secure data deduplication when potentially faced with an intentional collision instigated by an attacker. For example, such an attacker may generate two data blocks with the same hash value but different data content, write the two data blocks to the storage device array 108, and read the two data blocks back from the storage device array 108. The storage processor 106 may then incorrectly determine that the two data blocks are duplicates of one another, generate metadata for a first one of the data blocks that includes a pointer to a storage location of the other data block in the storage device array 108, and remove the first data block from the data storage system 104. The attacker may also attempt to generate a first data block predicted to be written to the storage device array 108 at some point-in-time in the future, generate another data block with the same hash value but different data content, and, before the first data block is written to the storage device array 108, write the other data block with the same hash value but different data content to the storage device array 108. In such exemplary ways, an attacker may attempt compromise the integrity of the storage device array 108, or, at the very least, publicly embarrass a manager or provider of the data storage system 104.

The disclosed data storage system 104 can guard against such intentional collisions by generating keyed hash values for data blocks (or multiples or fractions of data blocks) using a keyed hash function (or keyed universal hash function). As described herein, without knowing the key associated with the keyed hash function, merely having the hash of one input value to the keyed hash function would not be enough for an attacker to compute the hash of any other input value with a probability greater than simply choosing the hash of the other input value at random. Indeed, without knowing the key, such an attacker would be virtually incapable of implementing an intentional collision by pre-generating two data blocks having the same hash value but different data content. It is noted that, even if two data blocks with the same hash value but different data content were written without deceptive intent to the storage device array 108, an attacker would be virtually incapable of locating the two data blocks on the storage device array 108, without knowing the key used to generate the hash values for the respective data blocks.

An exemplary method of providing secure data deduplication with smaller hash values in the data storage system 104 of FIG. 1a is described below with reference to FIG. 2. As depicted in block 202, data is received at a storage processor for storage in one or more storage resources of a deduplication domain, in which the deduplication domain has an associated key. As depicted in block 204, the data is segmented into a plurality of data segments. As depicted in block 206, for a respective data segment among the plurality of data segments, the respective data segment and the key associated with the deduplication domain are inputted into a keyed hash function to generate a keyed hash value for the respective data segment. As depicted in block 208, a data deduplication operation is performed on the respective data segment using the keyed hash value for the respective data segment.

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions that, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of providing secure data deduplication with smaller hash values in a data storage system, the data storage system including a storage processor and a memory, the method comprising:
randomly generating a plurality of noncryptographic keys for a plurality of deduplication domains, respectively, the plurality of noncryptographic keys including a noncryptographic key for a respective deduplication domain from among the plurality of deduplication domains;
receiving, at the storage processor, data for storage in one or more storage resources of the respective deduplication domain;
segmenting the data into a plurality of data segments;
for at least a respective data segment from among the plurality of data segments, inputting only the respective data segment and the noncryptographic key for the respective deduplication domain into a universal hash function based on a Galois Message Authentication Code (GMAC) to obtain a keyed hash value for the respective data segment that has an acceptable probability of accidental collision for secure data deduplication;
maintaining the obtained keyed hash value for the respective data segment in an index table for the respective deduplication domain; and
performing a data deduplication operation on the respective data segment using the keyed hash value for the respective data segment.

2. The method of claim 1 further comprising:
storing the index table in the memory of the data storage system.

3. The method of claim 1 wherein the storage resources of the deduplication domain are located in a storage pool, and wherein the method further comprises:
storing the index table in the same storage pool as the storage resources of the deduplication domain.

4. The method of claim 1 wherein the performing of the data deduplication operation includes:
comparing the keyed hash value for the respective data segment with the respective keyed hash values maintained in the index table; and
determining whether the keyed hash value for the respective data segment matches any of the respective keyed hash values maintained in the index table.

5. The method of claim 4 further comprising:
having determined that the keyed hash value for the respective data segment matches one of the respective keyed hash values maintained in the index table, (i) generating metadata for the respective data segment, the metadata including the keyed hash value of the respective data segment, a pointer to a storage location of a data segment having the matching keyed hash value, and a reference to an original location of the respective data segment in the received data, and (ii) removing the respective data segment from the data storage system.

6. The method of claim 4 further comprising:
having determined that the keyed hash value for the respective data segment does not match any of the respective keyed hash values maintained in the index table, (i) storing the respective data segment in association with one or more other data segments from the received data at a storage location in one of the storage resources of the deduplication domain, and (ii) incorporating the keyed hash value of the respective data segment and a pointer that maps the keyed hash value of the respective data segment to the storage location of the respective data segment into a new entry for the index table.

7. The method of claim 1 further comprising:
accessing, over a network, the noncryptographic key for the respective deduplication domain of the one or more storage resources from a secure key server computer.

8. The method of claim 7 wherein the accessing of the noncryptographic key for the respective deduplication domain includes issuing, by the storage processor, a key request to the secure key server computer to obtain the noncryptographic key over the network.

9. A system for providing secure data deduplication with smaller hash values, comprising:
a plurality of storage resources of a respective deduplication domain from among a plurality of deduplication domains;
a memory; and
a storage processor operative to execute instructions out of the memory: to randomly generate a plurality of noncryptographic keys for a plurality of deduplication domains, respectively, the plurality of noncryptographic keys including a noncryptographic key for the respective deduplication domain;
to receive data for storage in one or more of the plurality of storage resources of the respective deduplication domain; to segment the data into a plurality of data segments;
for at least a respective data segment from among the plurality of data segments, to input only the respective data segment and the noncryptographic key for the respective deduplication domain into a universal hash function based on a Galois Message Authentication Code (GMAC) to obtain a keyed hash value for the respective data segment that has an acceptable probability of accidental collision for secure data deduplication;
to maintain the obtained keyed hash value for the respective data segment in an index table for the respective deduplication domain; and
to perform a data deduplication operation on the respective data segment using the keyed hash value for the respective data segment.

10. The system of claim 9 wherein the storage processor is further operative to execute the instructions out of the memory to store the index table in the memory.

11. The system of claim 9 wherein the plurality of storage resources of the deduplication domain is located in a storage pool, and wherein the storage processor is further operative to execute the instructions out of the memory to store the index table in the same storage pool as the plurality of storage resources of the deduplication domain.

12. A computer program product having a non-transitory computer readable medium that stores a set of instructions to provide secure data deduplication with smaller hash values in a data storage system, the set of instructions, when carried out by computerized circuitry, causing the computerized circuitry to perform a method of:
randomly generating a plurality of noncryptographic keys for a plurality of deduplication domains, respectively, the plurality of noncryptographic keys including a noncryptographic key for a respective deduplication domain from among the plurality of deduplication domains;
receiving, at a storage processor, data for storage in one or more storage resources of the respective deduplication domain; segmenting the data into a plurality of data segments;
for at least a respective data segment from among the plurality of data segments, inputting only the respective data segment and the noncryptographic key for the respective deduplication domain into a universal hash function based on a Galois Message Authentication Code (GMAC) to obtain a keyed hash value for the respective data segment that has an acceptable probability of accidental collision for secure data deduplication;
maintaining the obtained keyed hash value for the respective data segment in an index table for the respective deduplication domain; and
performing a data deduplication operation on the respective data segment using the keyed hash value for the respective data segment.

13. The method of claim 1 wherein the keyed hash value for the respective data segment is represented by the number of bits selected from the group consisting of 32, 64, and 96.

* * * * *